(12) United States Patent
Sasi et al.

(10) Patent No.: US 10,110,424 B1
(45) Date of Patent: Oct. 23, 2018

(54) NODE FAILURE RECOVERY TOOL

(71) Applicant: Bank of America Corporation, Charlotte, NC (US)

(72) Inventors: Akhil Sasi, Hoboken, NJ (US); William Lotridge, Brentwood, NY (US); Dinesh Chandramohan, Jersey City, NJ (US)

(73) Assignee: Bank of American Corporation, Charlotte, NC (US)

( * ) Notice: Subject to any disclaimer, the term of this patent is extended or adjusted under 35 U.S.C. 154(b) by 8 days.

(21) Appl. No.: 15/639,378

(22) Filed: Jun. 30, 2017

(51) Int. Cl.
*H04L 12/26* (2006.01)
*H04L 12/24* (2006.01)

(52) U.S. Cl.
CPC ...... *H04L 41/0672* (2013.01); *H04L 41/0677* (2013.01); *H04L 43/0864* (2013.01)

(58) Field of Classification Search
CPC ............ H04L 41/0672; H04L 41/0677; H04L 43/0864
USPC .............. 370/216–228, 241–253; 714/2–5.1, 714/25–31, 48–57; 398/1–36
See application file for complete search history.

(56) References Cited

U.S. PATENT DOCUMENTS

| | | | | |
|---|---|---|---|---|
| 5,241,534 A | * | 8/1993 | Omuro | H04L 45/10 370/218 |
| 5,768,250 A | * | 6/1998 | Albrecht | H04L 1/1607 370/216 |
| 6,147,967 A | * | 11/2000 | Ying | G06F 11/2242 370/222 |
| 6,421,316 B1 | * | 7/2002 | Masuo | H04L 45/02 370/216 |
| 6,789,114 B1 | | 9/2004 | Garg et al. | |
| 6,865,158 B2 | * | 3/2005 | Iwamoto | H04L 49/309 370/248 |
| 7,002,908 B1 | * | 2/2006 | Lund | H04L 49/1553 370/228 |
| 7,468,944 B2 | * | 12/2008 | Nishioka | H04L 41/0668 370/225 |
| 7,778,189 B2 | * | 8/2010 | Valli | H04L 29/12273 370/244 |
| 8,169,893 B1 | * | 5/2012 | Getker | H04L 45/22 370/217 |
| 9,021,091 B2 | | 4/2015 | Cheung et al. | |
| 9,049,126 B2 | | 6/2015 | Cheung et al. | |
| 9,202,249 B1 | | 12/2015 | Cohen et al. | |
| 9,344,447 B2 | | 5/2016 | Cohen et al. | |
| 9,454,785 B1 | | 9/2016 | Hunter et al. | |

(Continued)

*Primary Examiner* — Thai D Hoang
(74) *Attorney, Agent, or Firm* — Michael A. Springs

(57) ABSTRACT

A node failure recovery tool includes an interface and one or more processors. The interface is configured to receive a first portion and a second portion of state information from a first node. The one or more processors are configured to determine a time that the first portion of state information was received and store the first portion of state information and the time that the first portion of state information was received. The one or more processors are further configured to determine a time that the second portion of state information was received and start a timer, determine that the timer has expired and that the third portion of state information has not been received, and after determining that the first node has crashed, send a retrieved second portion of state information to the first node so that the first node can recover from the crash.

20 Claims, 7 Drawing Sheets

(56) References Cited

U.S. PATENT DOCUMENTS

| | | | |
|---|---|---|---|
| 9,521,089 B2 | 12/2016 | Hu et al. | |
| 9,524,328 B2 | 12/2016 | Horowitz et al. | |
| 2003/0095505 A1* | 5/2003 | Wells | H05K 7/1484 |
| | | | 370/242 |
| 2003/0133405 A1* | 7/2003 | Blorec | H04J 3/14 |
| | | | 370/218 |
| 2005/0259587 A1* | 11/2005 | Wakumoto | H04L 43/50 |
| | | | 370/248 |
| 2006/0092831 A1* | 5/2006 | Hartnett | H04J 3/14 |
| | | | 370/217 |
| 2013/0117766 A1* | 5/2013 | Bax | G06F 9/4405 |
| | | | 719/323 |
| 2014/0215221 A1* | 7/2014 | Gauvreau | H04L 9/0891 |
| | | | 713/176 |
| 2014/0289165 A1 | 9/2014 | Dinesh Chheda | |
| 2015/0120524 A1 | 4/2015 | Domowitz et al. | |
| 2015/0186995 A1 | 7/2015 | Renalds et al. | |
| 2015/0304989 A1* | 10/2015 | Zhu | H04W 36/0066 |
| | | | 370/252 |
| 2016/0063628 A1 | 3/2016 | Kreider et al. | |
| 2016/0149801 A1* | 5/2016 | Morosan | H04L 45/22 |
| | | | 370/228 |
| 2016/0292008 A1 | 10/2016 | Kumar et al. | |
| 2016/0307267 A1 | 10/2016 | Chen et al. | |
| 2016/0328798 A1 | 11/2016 | Thakkar | |
| 2016/0337467 A1 | 11/2016 | Parmar et al. | |

* cited by examiner

NODE FAILURE RECOVERY TOOL

TECHNICAL FIELD

This disclosure relates generally to node failures on a network. More specifically, this disclosure relates to a node failure recovery tool to facilitate the recovery of a node after a node failure.

BACKGROUND

Generally, a node in a network may communicate information with one or more other nodes on the network. As an example, a first node may communicate information with a second node when the second node must be updated with the information. The information being communicated may be sent in portions or phases to the one or more other nodes. In some circumstances, a node responsible for communicating the information may crash or otherwise fail, which can prevent the intended recipient node from receiving one or more portions of information.

SUMMARY OF THE DISCLOSURE

According to one embodiment, a node failure recovery tool includes an interface and one or more processors. The interface is configured to receive a first portion and a second portion of state information from a first node, each of the first and second portion of state information comprising data about a user and an action and an indication that a third portion of state information is to be received. The one or more processors are configured to determine a time that the first portion of state information was received, and store, in a memory, the first portion of state information and the time that the first portion of state information was received. The one or more processors are further configured to determine a time that the second portion of state information was received and start a timer upon receiving the second portion of state information from the first node, determine that the second portion of state information includes data about a first user and a first action, and determine that the stored first portion of state information includes data about the first user and the first action. The one or more processors are further configured to replace, in the memory, the first portion of state information with the second portion of state information in response to determining that the time that the second portion of state information was received is later than the time that the first portion of state information was received and that the first and second portions of state information includes data about the first user and the first action. The one or more processors are further configured to determine that the timer has expired and that the third portion of state information has not been received, and, upon determining that the timer has expired and that the third portion of state information has not been received, determine that the first node has crashed. After determining that the first node has crashed, the one or more processors are further configured to retrieve, from the memory the second portion of state information and send the retrieved second portion of state information to the first node so that the first node can recover from the crash.

According to another embodiment, a method includes receiving a first portion and a second portion of state information from a first node, each of the first and second portion of state information comprising data about a user and an action and an indication that a third portion of state information is to be received. The method further includes determining a time that the first portion of state information was received and storing, in a memory, the first portion of state information and the time that the first portion of state information was received. The method further includes determining a time that the second portion of state information was received and start a timer upon receiving the second portion of state information from the first node, determining that the second portion of state information includes data about a first user and a first action, and determining that the stored first portion of state information includes data about the first user and the first action. Further, the method includes, replacing, in the memory, the first portion of state information with the second portion of state information in response to determining that the time that the second portion of state information was received is later than the time that the first portion of state information was received and that the first and second portions of state information includes data about the first user and the first action, determining that the timer has expired and that the third portion of state information has not been received, and, determining that the first node has crashed upon determining that the timer has expired and that the third portion of state information has not been received. The method further includes, after determining that the first node has crashed, retrieving, from the memory, the second portion of state information and sending the retrieved second portion of state information to the first node so that the first node can recover from the crash.

According to yet another embodiment, a system includes a first node and a node failure recovery tool. The first node is configured to send a first portion and a second portion of state information, each of the first and second portion of state information comprising data about a user and an action and an indication that a third portion of state information is to be received. The node failure recovery tool includes an interface and one or more processors. The interface is configured to receive the first portion and the second portion of state information from the first node. The one or more processors are configured to determine a time that the first portion of state information was received and store, in a memory, the first portion of state information and the time that the first portion of state information was received. The one or more processors are further configured to determine a time that the second portion of state information was received and start a timer upon receiving the second portion of state information from the first node, determine that the second portion of state information includes data about a first user and a first action, and determine that the stored first portion of state information includes data about the first user and the first action. In response to determining that the time that the second portion of state information was received is later than the time that the first portion of state information was received and that the first and second portions of state information includes data about the first user and the first action, the one or more processors are further configured to replace, in the memory, the first portion of state information with the second portion of state information. The one or more processors are further configured to determine that the timer has expired and that the third portion of state information has not been received and, upon determining that the timer has expired and that the third portion of state information has not been received, determine that the first node has crashed. After determining that the first node has crashed, the one or more processors are further configured to retrieve, from the memory, the second portion of state information and send the retrieved second portion of state information to the first node so that the first node can recover from the crash.

Certain embodiments may provide one or more technical advantages. For example, an embodiment of the present disclosure may improve network bandwidth usage by preventing redundant transmission of data after a node has failed. As another example, an embodiment of the present disclosure may improve the ability for a node to recover after a crash by communicating a pre-crash state to the node. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 7 of the drawings, like numerals being used for like and corresponding parts of the various drawings.

A node responsible for communicating one or more portions of information to another node may crash or otherwise fail before the intended recipient node has received each portion of information. In such a scenario, the intended recipient node is left with incomplete (or in some cases, totally unusable) information. The conventional method for recovering from a crash involves taking periodic snapshots of state information for the system and notifying the recovering node of the last-saved state information. Although the conventional method may facilitate node recovery, reliance on last-saved state information may result in the double-sending and/or double-processing of information because the last-saved state may not indicate the state of the node immediately before the crash. For example, reliance on the last-saved state information may cause the recovering node to communicate information it had previously communicated to another node thus wasting network bandwidth. As another example, reliance on the last-saved state information may cause the intended recipient node to receive information it had previously received and to make determinations about whether to disregard certain portions of information following a node crash within the system, thus wasting processing resources and time. Therefore, the conventional method of node recovery may be inefficient because of the sending and receiving of duplicative information and because it may result in longer processing times.

This disclosure contemplates an unconventional system wherein state information is embedded within the communications that are sent from a node to another node and a node failure recovery tool (also referred to herein as "NFRT") that monitors the communications between nodes. Upon determining that a node has crashed, the node failure recovery tool may alert the recovering node of the state information last sent from the recovering node to facilitate node recovery. In some embodiments, the node failure recovery tool facilitates node recovery by updating, in a memory, the state information last received from the recovering node and by sending the stored state information to the recovering node once the node becomes operational. In this manner, each portion of information is sent exactly once and the system avoids any duplicative sending and processing. Accordingly, the node failure recovery tool may improve the underlying computers and network by improving the efficiency of communications between nodes and reduce the time needed for a node to recover from a crash.

Figure 1:
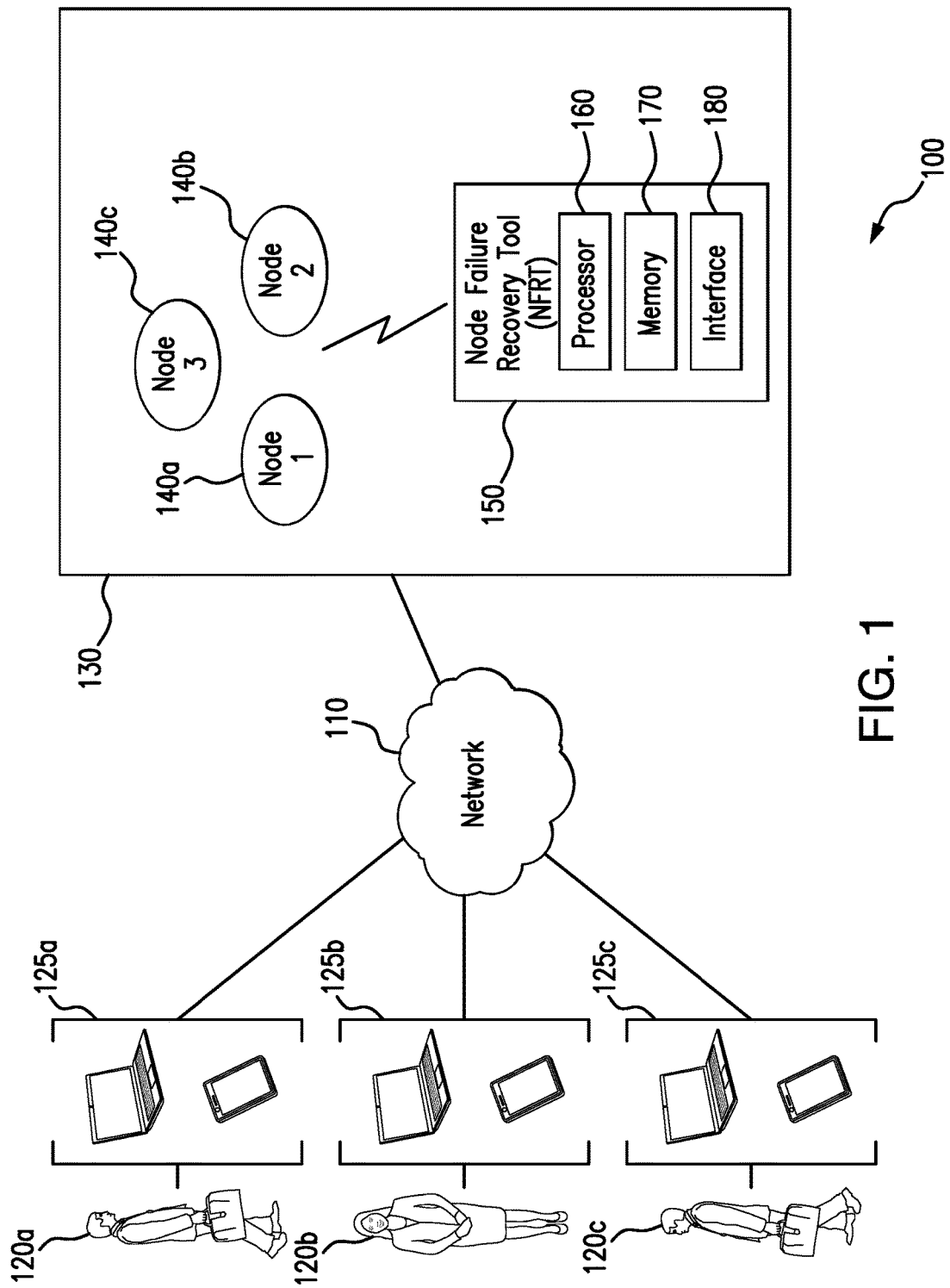
FIG. 1 is a block diagram illustrating a network environment for a system comprising a node failure recovery tool, according to certain embodiments.

FIG. 1 illustrates a network environment 100 for a system 130 that facilitates node recovery using a node failure recovery tool 150. As illustrated in FIG. 1, network environment 100 includes a network 110, one or more users 120, devices 125, and system 130. In some embodiments, system 130 may include one or more nodes 140 and node failure recovery tool 150. Generally, node failure recovery tool 150 facilitates the recovery of node(s) 140 upon determining that node(s) 140 have crashed or otherwise failed.

Network 110 may facilitate communication between and amongst components of network environment 100. This disclosure contemplates network 110 being any suitable network operable to facilitate communication between the components of network environment 100. For example, network 110 may permit users 120 to interact with system 130. As another example, network 110 may permit users 120 to interact with each other. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, network environment 100 may include one or more users 120 in some embodiments. As depicted in FIG. 1, network environment 100 includes three users 120a, 120b, and 120c. As is also depicted in FIG. 1, each user 120 is associated with one or more devices 125. For example, user 120a is associated with devices 125a, user 120b is associated with devices 125b, and user 120c is associated with devices 125c. In some embodiments, users 120 use devices 125 to interact with system 130 over network 110. For example, users 120 may use devices 125 to update account information, make withdrawals, and/or deposit funds. In some embodiments, a user's interactions with system 130 may require one or more nodes 140 of system 130 to communicate with one or more other nodes 140.

As another example, user 120*b* may use device 125*b* to send information about a malfunction or other error of system 130. One or more nodes 140 of system 130 may be involved with the handling and resolution of issues reported by users 120 via devices 125. For example, node 140*a* may be responsible for identifying the reported issue and communicating the reported issue to appropriate nodes 140 of system 130 that can resolve the reported issue (e.g., node 2 140*b*). As such, node 1 140*a* may receive a report from user 120*b* that she is unable to connect to system 130. In response, node 1 140*a* may identify the issue as a connectivity issue and relay the issue and associated information to node 2 140*b* which may be responsible for resolving connectivity issues. Although particular interactions have been described herein, this disclosure recognizes that users 120 may interact with system 130 in any suitable manner.

This disclosure contemplates device 125 being any appropriate device that can communicate over network 110. For example, device 125 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 125 may also include a user interface, such as a display, a microphone, keypad, or other appropriate terminal equipment usable by a user. In some embodiments, an application executed by device 125 may perform the functions described herein.

System 130 includes one or more nodes 140. As described above, each node 140 may be responsible for updating and/or maintaining information. In some embodiments, system 130 includes one or more back-up nodes. As an example, node 3 140*c* may be configured to update and/or maintain the same type of information as node 1 140*a*. Such back-up nodes may be configured to operate only when the node that they are backing up has crashed or otherwise failed. As an example, node 3 140*c* may be configured to send details of user 120*a*'s interaction with node 2 140*b* when node 1 140*a* has failed.

System 130 also includes node failure recovery tool 150. As described above, node failure recovery tool 150 may facilitate the recovery of nodes 140 after determining that nodes 140 have crashed or otherwise failed. This and other functionality of node failure recovery tool 150 will be described in further detail below in reference to FIGS. 2-6. In some embodiments, node failure recovery tool 150 is positioned in a middleware layer of a distribution system. Node failure recovery tool 150 includes one or more processors, one or more memories, and one or more interfaces. As illustrated in FIG. 1, node failure recovery tool 150 includes a processor 160, a memory 170, and an interface 180.

Processor 160 executes various methods (e.g., methods 600 and 700 illustrated in FIGS. 6 and 7) of node failure recovery tool 150. In some embodiments, memory 170 is configured to store information such as algorithms that correspond to methods (e.g., methods 600 and 700 illustrated in FIGS. 6 and 7) executed by node failure recovery tool 150. Memory 170 stores the information, or portions of information, communicated between nodes 140. For example, node failure recovery tool 150 may store state information corresponding to data sent from node 1 140*a* to node 2 140*b* in memory 170. Although this disclosure describes and depicts node failure recovery tool 150 including memory 170, this disclosure recognizes that node failure recovery tool 150 may not include memory 170 in some embodiments. For example, memory 170 may be a stand-alone component or part of a component connected to network 110, such as a database accessible to node failure recovery tool 150 via network 110.

Interface 180 of node failure recovery tool 150 is configured to receive information. The received information may include one or more portions of information and may be received from nodes 140. As an example, interface 180 may be configured to receive one or more portions of information 210 communicated between node 1 140*a* and node 2 140*b*. Each portion of information received by interface 180 includes state information. State information may include data corresponding to a particular user, data corresponding to a particular action, and/or an indication of whether the portion of state information is related to one or more other portions of state information. For example, state information may be received by interface 180 that includes data indicating that user 120*a* wants to log in to system 130 using user 120*a*'s username and password. Such state information may further include an indication that details about this interaction will be sent in three separate portions (e.g., 210*a*, 210*b*, and 210*c* in FIG. 2). Although this disclosure describes that state information may include certain types of information, this disclosure recognizes that state information may include any suitable type of information.

In some embodiments, node failure recovery tool 150 may be a program executed by a computer system. As an example, node failure recovery tool 150 may be executed by a computer such as computer 700 described below in reference to FIG. 7. In such example, memory 170 may be memory 720, processor 160 may be processor 710 of computer 700, and interface 180 may be interface 750.

Figure 2:
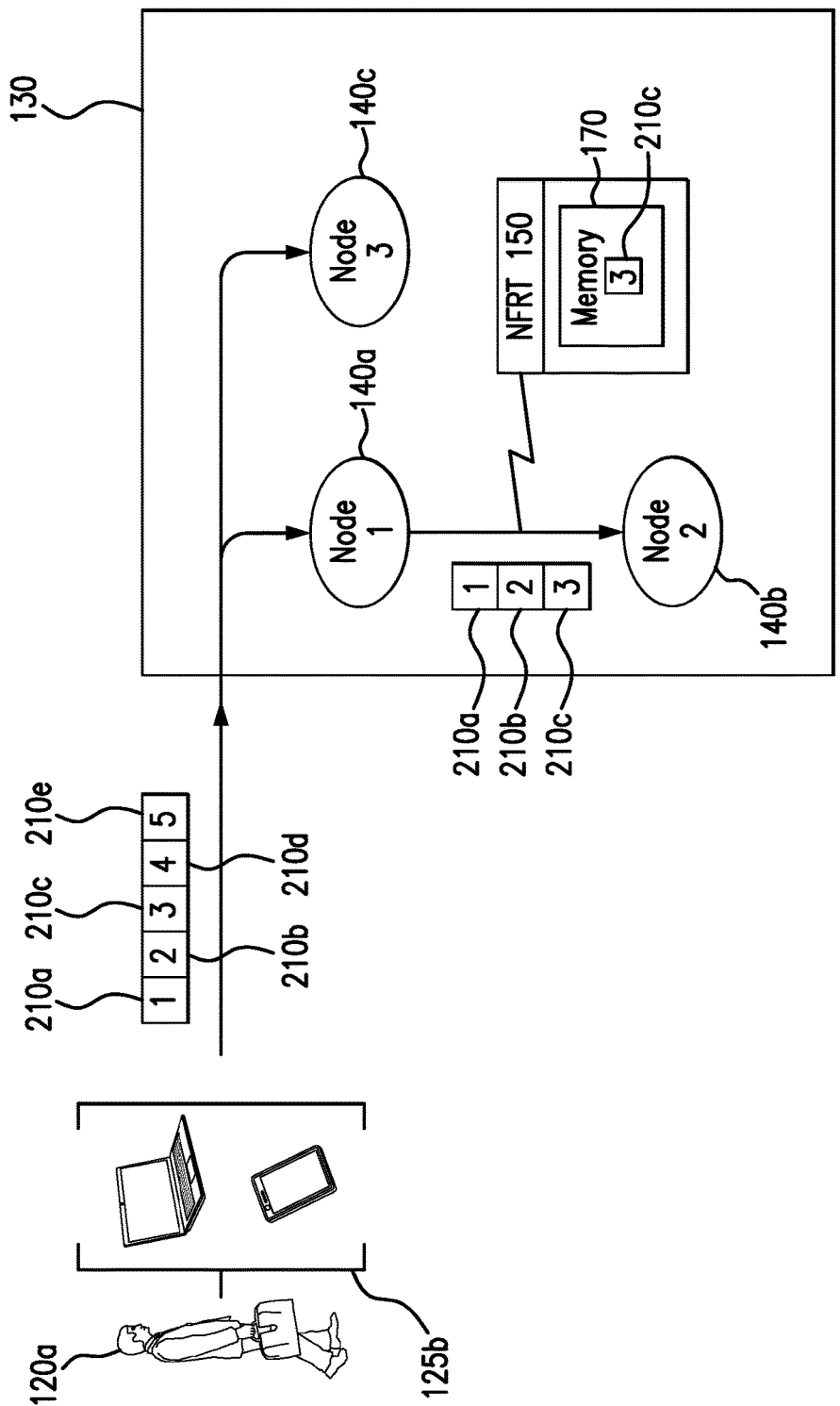
FIG. 2 is a block diagram illustrating a user interacting with the system of FIG. 1, according to certain embodiments.

FIG. 2 illustrates a user 120 interacting with system 130. Generally, FIG. 2 illustrates system 130 receiving information 210 from users 120. Information 210 may comprise one or more portions. As illustrated in FIG. 2, information 210 comprises five portions 210*a-e*. Each portion of information (e.g., 210*a-e*) may include state information that includes data corresponding to a user 120 and an action related to the user 120 and an indication of whether the portion of state information is related to one or more other portions of state information. For example, portion 210*a* may include state information regarding user 120*a* and an action of user 120*a* (e.g., update address on account). State information included in portion 210*a* may also include an indication that it is related to portions 210*b-e*.

Portions of information 210*a-e* may be sent over network 110 to system 130 and may be relayed between one or more nodes 140. As illustrated in FIG. 2, node 1 140*a* and node 3 140*c* receive information portions 210*a-e*. Although this disclosure describes and depicts that only two nodes 140 receive information portions 210, this disclosure recognizes that any suitable number of nodes 140 may receive information portions 210. In some embodiments, the nodes that receive information portions 210 may be configured to communicate one or more of the received information portions 210 to another node 140 in system 130. As is illustrated in FIG. 2, node 1 140*a* is configured to send one or more portions of portions 210*a-e* to node 2 140*b*. As described above, node 3 140*c* may also be configured to send one or more portions of portions 210*a-e* to node 2 140*b* but it is only configured to do so when node 1 140*a* is not operational.

Node failure recovery tool 150 receives state information about each information portion 210 communicated between and/or amongst nodes 140. For example, as illustrated in FIG. 2, node failure recovery tool 150 is configured to receive state information corresponding to information portions 210a-c sent from node 1 140a to node 2 140b. Node failure recovery tool 150 may be configured to determine, for each information portion 210 sent from one node 140 to another, a time corresponding to the information portion 210. In some embodiments, the time determined by node failure recovery tool 150 for an information portion 210 is the time that interface 180 of node failure recovery tool 150 received state information corresponding to an information portion 210. As an example, node failure recovery tool 150 may determine that the time corresponding to information portion 210a is 12:00:01 p.m. because it received the state information of information portion 210a at 12:00:01 p.m. As another example, node failure recovery tool 150 may determine that the time corresponding to information portion 210b is 12:00:03 p.m. because it received the state information of information portion 210b at 12:00:03 p.m. As yet another example, node failure recovery tool 150 may determine that the time corresponding to information portion 210c is 12:00:05 p.m. because it received the state information of information portion 210c at 12:00:05 p.m.

As described above, node failure recovery tool 150 may be configured to store state information and information about state information. As an example, node failure recovery tool 150 may store state information corresponding to one or more information portions 210 in memory 170. As another example, node state recovery tool 150 may store the determined time corresponding to the state information. In some embodiments, node failure recovery tool 150 is configured to store all state information and/or information about state information. In other embodiments, node failure recovery tool 150 selectively stores state information and/or information about state information. Node failure recovery tool 150 may be further configured to store a particular portion of state information and subsequently replace the stored state information with a related portion of state information. Stated differently, node failure recovery tool 150 may be configured to replace, in memory 170, older state information with newer state information related to the same user and the same action. As an example, node failure recovery tool 150 may receive information portion 210a comprising a first state information and store first state information in memory 170. Subsequently, node failure recovery tool 150 may receive information portion 210b comprising a second state information (related to the same user and same action as the state information of information portion 210a) and replace, in memory 170, first state information with second state information.

The replacement of state information may be further understood in reference to FIG. 2. As illustrated in FIG. 2, node 1 140a sends information portions 210a-c to node 2 140b. Node failure recovery tool 150 may monitor the communications between node 1 140a and node 2 140b and store state information corresponding to each information portion 210 sent by node 1 140a. For example, upon determining that node 1 140a sent information portion 210a, node failure recovery tool 150 may store, in memory 170, state information corresponding to information portion 210a. Subsequently, upon determining that node 1 140a sent information portion 210b to node 2 210b, node failure recovery tool 150 may replace, in memory 170, state information corresponding to information portion 210a with state information corresponding to information portions 210b. As illustrated in FIG. 2, node failure recovery tool 150 has determined that node 1 140a has sent information portion 210c to node 2 140b and replaced, in memory 170, state information corresponding to information portion 210b with state information corresponding to information portions 210c. In this manner, node failure recovery tool 150 may store the state information corresponding to the information portion 210 most recently sent by node 1 140a.

In some embodiments, determining whether to replace state information in memory includes identifying that the second state information includes information about the same user 120 and action as the first state information and determining that the second state information was received at a later time than the first state information. Taking the example above, node failure recovery tool 150 may store state information corresponding to information portion 210a (received at 12:00:01 p.m.), and upon determining that state information corresponding to information portion 210b (received at 12:00:03 p.m.) includes information about the same user 120 and the same action, replace state information corresponding to information portion 210a in memory with state information corresponding to information portion 210b.

As will be explained in further detail below in reference to FIGS. 3-6, node failure recovery tool 150 may be configured to determine that a node 140 of system 130 has crashed or otherwise failed. In some embodiments, node failure recovery tool 150 may determine that a node 140 has crashed by keeping track of the time elapsed between receipt or non-receipt of related portions of state information. For example, node failure recovery tool 150 may start a timer upon receiving, from a first node (e.g., node 1 140a), state information indicating that related state information will be sent by the first node (e.g., node 1 140a). If, upon expiration of the timer, node failure recovery tool 150 has not received the related state information, node failure recovery tool 150 may determine that the first node has crashed. In contrast, if node failure recovery tool 150 determines that the related state information has been received prior to expiration of the timer, node failure recovery tool 150 may determine that the first node has not crashed. In some embodiments, the amount of time on the timer is always the same (e.g., 2 seconds). In other embodiments, the amount of time on the timer depends on some external factor (e.g., user 120's strength of connection to network 110 or the congestion of network 110). In yet other embodiments, the amount of time on the timer is set by an administrator of system 130. Although this disclosure describes particular ways to determine the amount of time on a timer, this disclosure recognizes that the amount of time on the timer may be any suitable time and may depend on any suitable factor.

Figure 3:
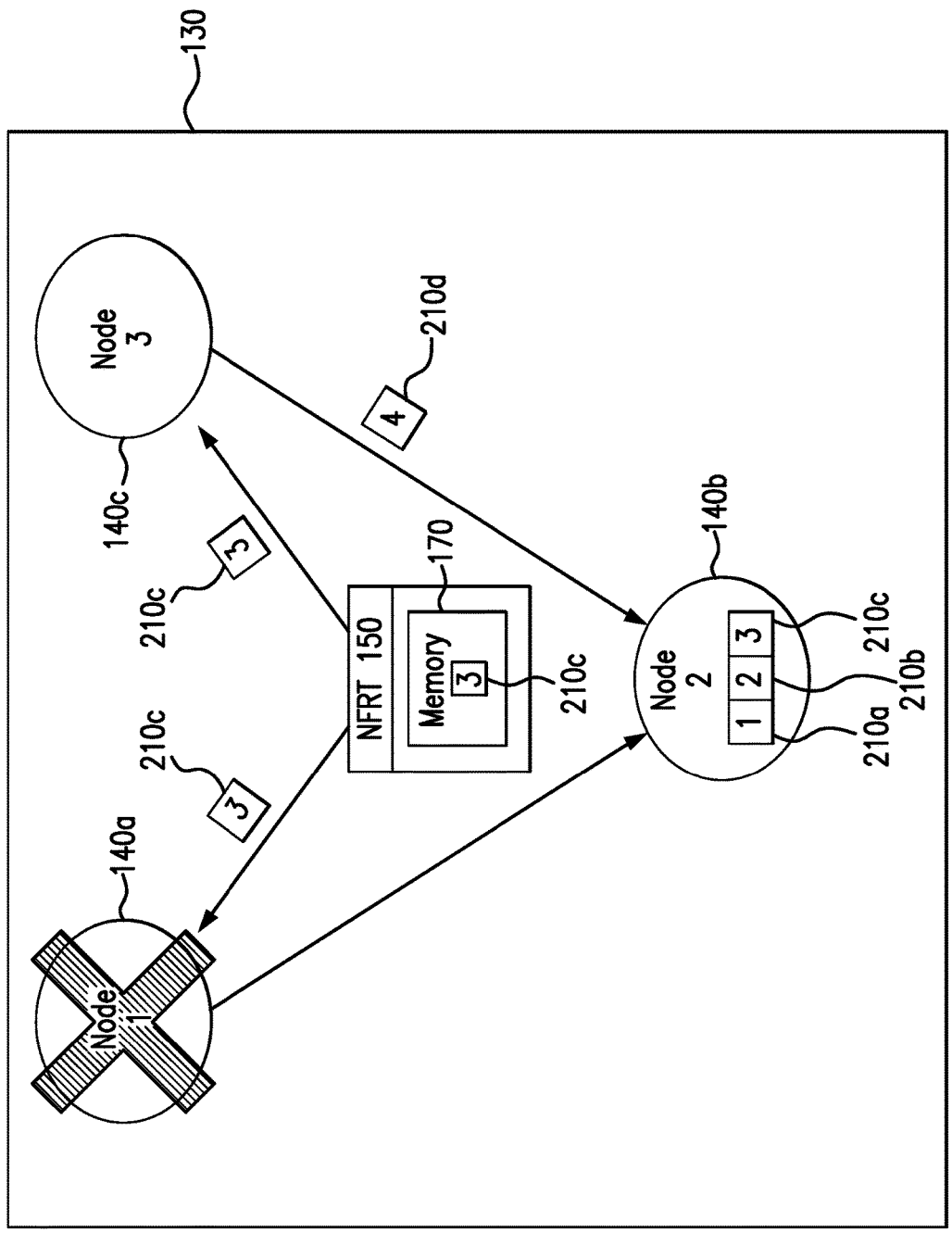
FIG. 3 is a block diagram illustrating an embodiment of the system of FIG. 1 after the node failure recovery tool of FIG. 1 has detected a node crash, according to certain embodiments.

FIG. 3 illustrates an embodiment of system 130 after node failure recovery tool 150 has determined that node 1 140a has crashed. As described above, node failure recovery tool 150 may determine that node 1 140a has crashed because it did not receive a portion of state information that it was expecting to receive prior to the expiration of a timer. In some embodiments, node failure recovery tool 150 facilitates the recovery of a crashed node after discovering that a node has crashed. For example, in response to determining that node 1 140a has crashed, node state failure recovery tool 150 may facilitate the recovery of node 1 140a. In some embodiments, facilitating the recovery of a node 140 includes determining the portion of state information that was last received from the crashed node and sending that portion of state information to the crashed node once the crashed node becomes operational. As an example, node failure recovery tool 150 may retrieve, from memory 170, the state information last received from the crashed node and send the retrieved state information to the crashed node. In some embodiments, node failure recovery tool 150 sends the retrieved state information to the crashed node immediately after determining that the crashed node has crashed. In other embodiments, node failure recovery tool 150 sends the retrieved state information to the crashed node after determining that the crashed node has become operational. Node failure recovery tool 150 may determine that the crashed node has become operational based on receiving a start-up message (see e.g., start-up message 410 of FIG. 4) from the crashed node. Node 1 140*a* may use the state information 210 received from node failure recovery tool 150 (e.g., state information 210*c*) to recover from the crash. For example, node 1 140*a* may determine, based on the state information 210 received from node failure recovery tool 150 (e.g., state information 210*c*) to send the next-in-sequence information portion (e.g., state information 210*d*) to node 2 140*b*. As a result, node 1 140*a* does not send the same state information to node 2 140*b* more than one time and node 2 140*b* does not have to process previously received state information more than once.

In other embodiments, node failure recovery tool 150 may retrieve, from memory 170, the state information last received from the crashed node and send the retrieved state information to a node other than the crashed node. This example is illustrated in FIG. 3. Specifically, FIG. 3 illustrates node 3 140*c* communicating information portions 210 to node 2 140*b* during the time that node 1 140*a* has crashed. As described above with regards to FIG. 1, node 3 140*c* may be a back-up node to node 1 140*a* which receives the same information portions 210 as node 1 140*a*. In response to receiving state information from node failure recovery tool 150 (illustrated in FIG. 3 as information portion 210*c*), node 3 140*c* may become operational and send the next-in-sequence information portion 210 (e.g., information portion 210*d*) to node 2 140*b*. After receiving state information corresponding to the next-in-sequence information portion 210, node failure recovery tool 150 may replace, in memory 170, previously stored state information with state information corresponding to the next-in-sequence information portion 210 (e.g., replace state information corresponding to information portion 210*c* with state information corresponding to information portion 210*d*). This disclosure recognizes various benefits associated with utilizing back-up node 3 140*c* during the periods of time while node 1 140*a* is down. For example, utilizing back up node 3 140*c* may decrease the time it takes to communicate related portions 210 of information from one node 140 to another.

Figure 4:
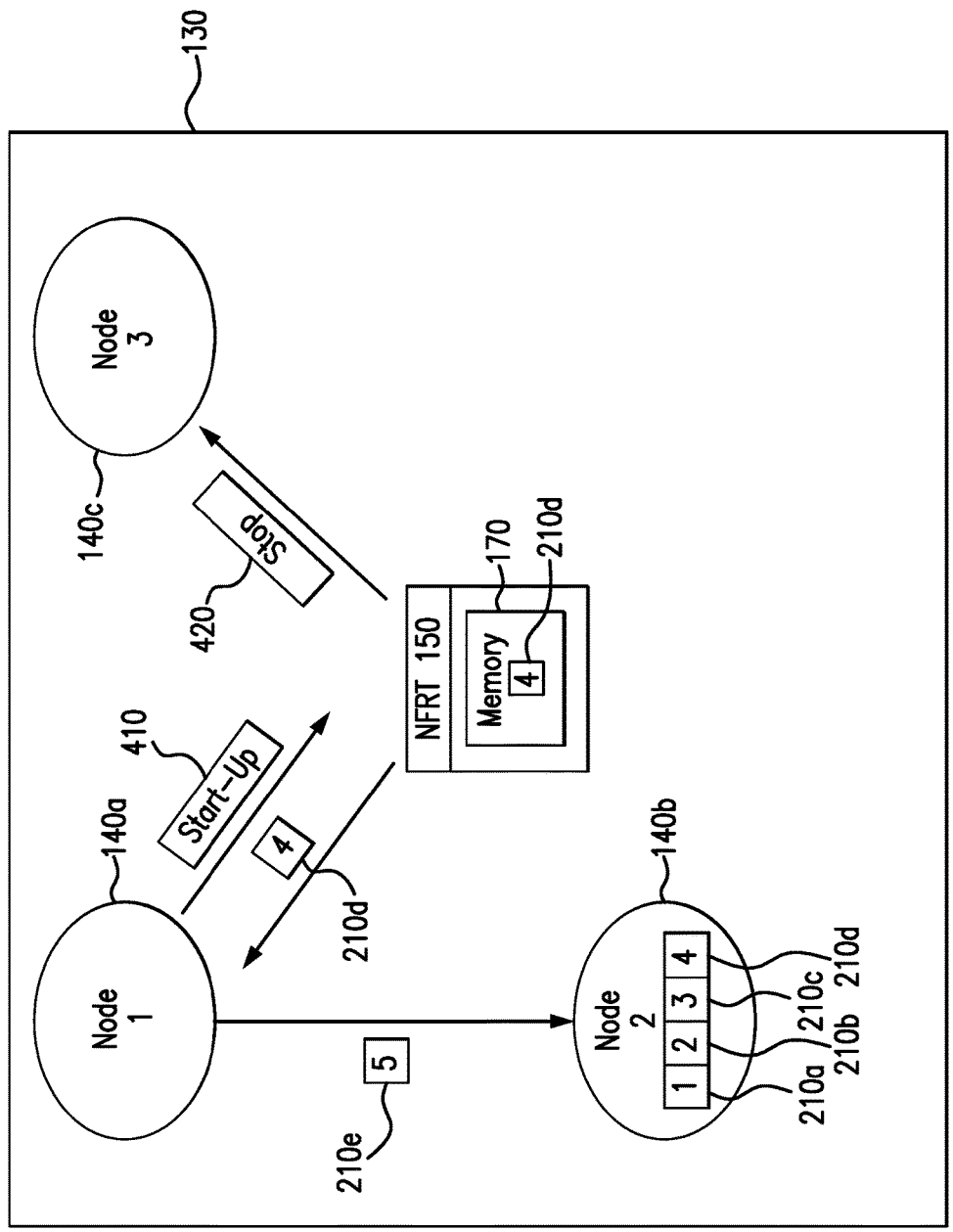
FIG. 4 is a block diagram illustrating an embodiment of the system of FIG. 1 after a crashed node becomes operational, according to certain embodiments.

FIG. 4 illustrates an embodiment of system 130 after a node becomes operational after a crash or failure. As described above, node failure recovery tool 150 may be configured to determine that a node that had previously crashed has since become operational. Node failure recovery tool 150 may make this determination based on receiving a message from the crashed node after determining that the node has crashed. As illustrated in FIG. 4, node 1 140*a* may send a start-up message 410 to node failure recovery tool 150 upon coming back online or otherwise becoming operational. In another embodiment, node failure recovery tool 150 determines that a previously crashed node is operational by determining that node 1 140*a* begins/resumes communications with another node. For example, node failure recovery tool 150 may determine that node 1 140*a* is operational because it receives state information corresponding to an information portion 210. Although this disclosure describes specific ways of determining that a node has become operational, this disclosure recognizes that node failure recovery tool 150 may determine that a crashed node has become operational in any suitable manner.

In some embodiments, node failure recovery tool 150 sends a stop message 420 to back-up node 3 140*c* after determining that node 1 140*a* has become operational. Stop message 420 may include instructions for a node 140 to cease communications with a different node. For example, as illustrated in FIG. 4, node failure recovery tool 150 sends a stop message 420 to back-up node 3 140*c* to instruct node 3 140*c* to cease communications with node 2 140*b*. In some embodiments, stop message 420 prevents node 3 140*c* from sending/continuing to send one or more information portions 210 to node 2 140*b*. As a result, node 1 140*a* may send non-duplicative information portions 210 to node 2 140*b* once it becomes operational after a crash.

As stated above, a crashed node may utilize state information sent by node failure recovery tool 150 to facilitate node recovery. As illustrated in FIG. 4, node failure recovery tool 150 retrieves and sends state information corresponding to the most recently stored information portion 210 (e.g., information portion 210*d* stored in memory 170) to node 1 140*a* to facilitate node recovery. Node 1 140*a* may in turn use this state information to determine a next-in-sequence information portion 210 to send to node 2 140*b*. Thus, in response to receiving notification that the last information portion 210 sent to node 2 140*b* was information portion 210*d*, node 1 140*a* may determine to send information portion 210*e*. The sending of information portion 210*e* to node 2 140*b* may then result in node failure recovery tool 150's replacement of state information corresponding to information portion 210*d* with state information corresponding to information portion 210*e* in memory 170. In this manner, node failure recovery tool 150 may ensure that nodes 140 of system 130 only send the same information portion 210 to a recipient node 140 one time, thereby preventing any duplicative sending and/or processing of information portions 210.

In some embodiments, node failure recovery tool 150 is further configured to determine various statistics associated with one or more nodes 140 of system 130. For example, node failure recovery tool 150 may determine a throughput and/or latency of a node 140 of system 130. As used herein, the throughput of a node 140 may be the rate at which a node 140 can process information (e.g., an information portion 210). In some embodiments, the throughput of a node 140 is based at least on the time that a node 140 receives a particular portion of information (e.g., information portion 210*a*). As used herein, the latency of a node 140 may be the delay between the sending and relaying of information (e.g., the delay between the receiving and relaying of information portion 210). In some embodiments, the latency of a node 140 is based on amount of time between receiving information (e.g., information portion 210) and publishing that information to another node 140. These and other determinations may be performed by one or more processors 160 of node failure recovery tool 150.

Figure 5:
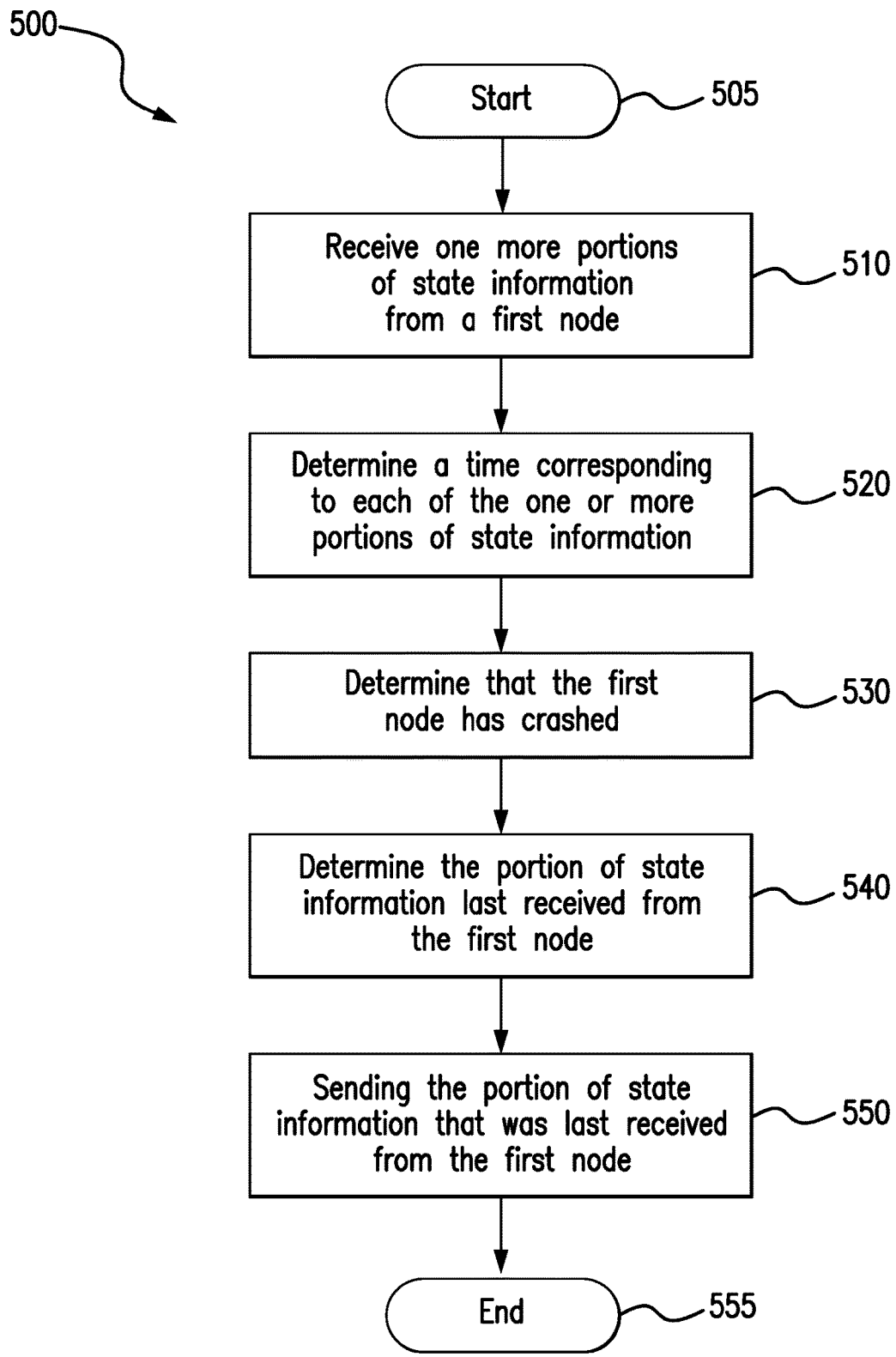
FIG. 5 is a flow chart illustrating a method for facilitating the recovery of a node using the node failure recovery tool of FIG. 4, according to one embodiment of the present disclosure.
Figure 6:
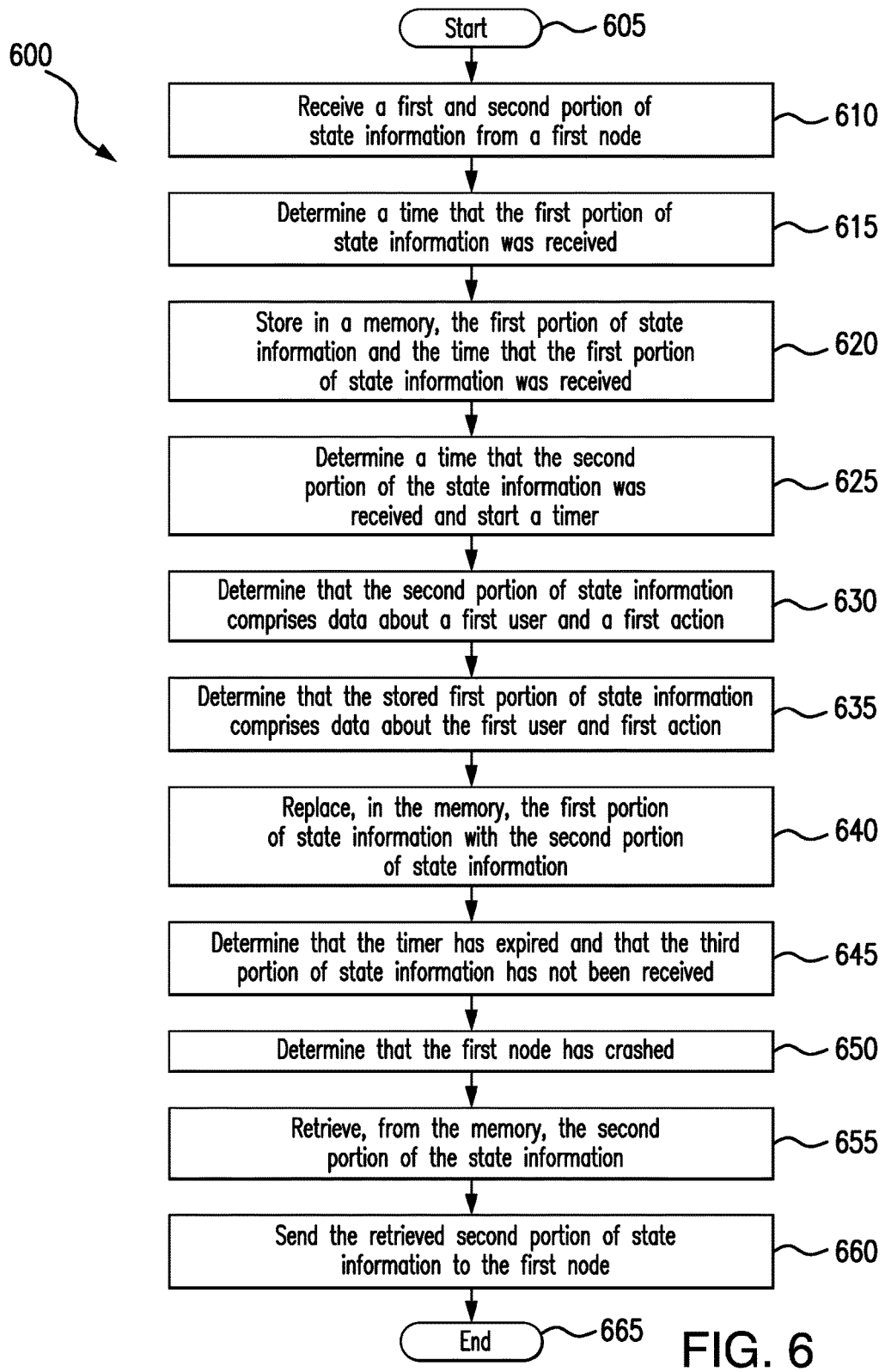
FIG. 6 is a flow chart illustrating another method for facilitating the recovery of a node using the node failure recovery tool of FIG. 4, according to certain embodiments.
Figure 7:
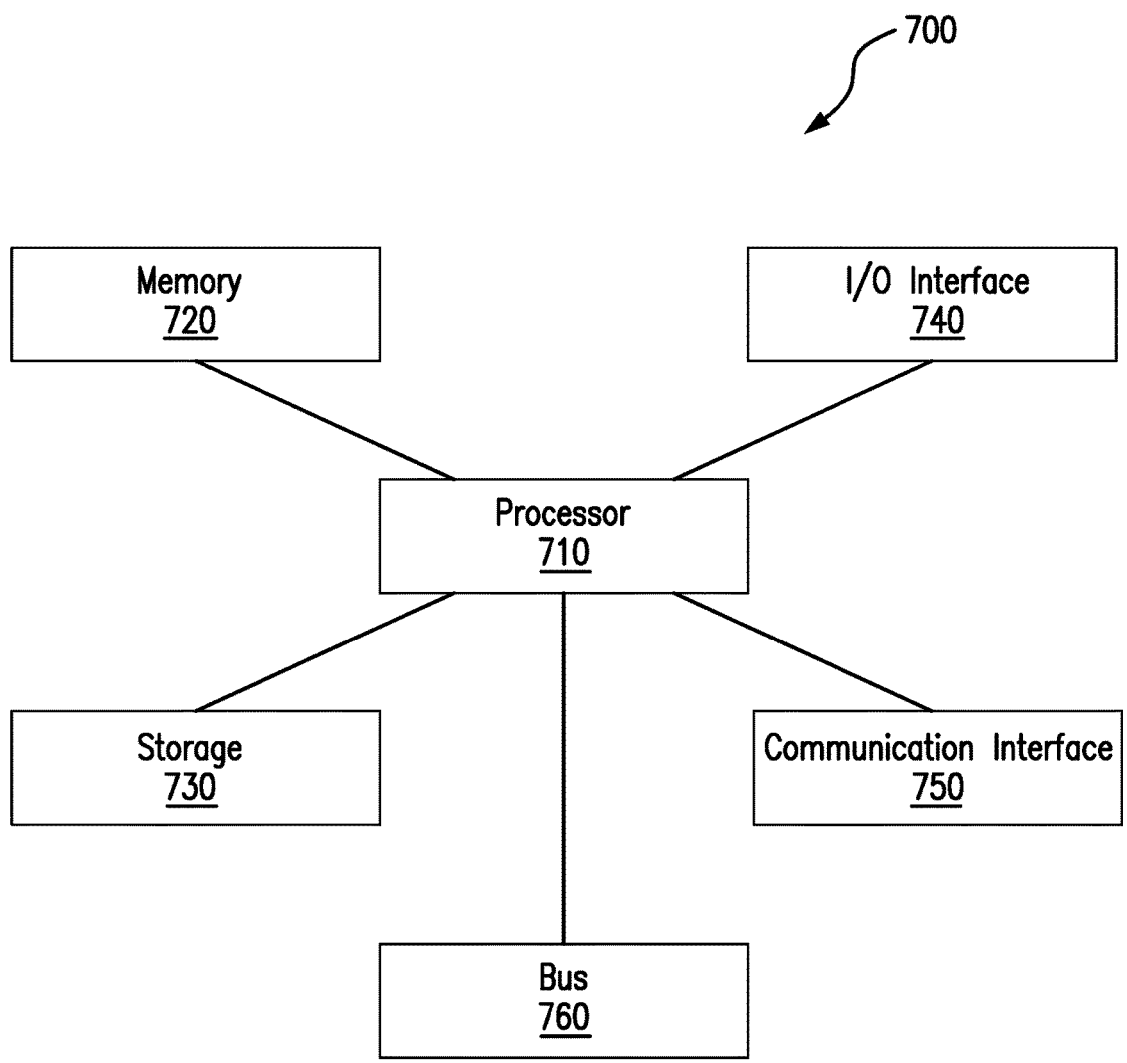
FIG. 7 is a block diagram of a computer configured to implement the methods of FIGS. 5 and 6, according to certain embodiments.

FIG. 5 illustrates a method 500 of facilitating the recovery of a node following a crash or other failure of the node. In some embodiments, the method 500 is performed by node failure recovery tool 150. Method 500 may be an algorithm stored to memory 170 of node failure recovery tool 150 and may be executable by processor 160 of node failure recovery tool 150. The method 500 begins in a step 505 and proceeds to step 510. At step 510, node failure recovery tool 150 receives one or more information portions 210 from a first node (e.g., node 1 140a). In some embodiments, each information portion 210 received by node failure recovery tool 150 includes state information. As described above, state information may comprise one or more of data corresponding to a user, data corresponding to an action, and/or an indication of whether the portion of state information is related to one or more other portions of state information. In some embodiments, each information portion 210 received by node failure recovery tool 150 is part of a larger set of data being communicated from one node to another (e.g., from node 1 140a to node 2 140b). In some embodiments, after receiving the one or more portions of state information, the method 500 continues to step 520.

At step 520, node failure recovery tool 150 determines a time corresponding to each of the received portions of state information. In some embodiments, the time corresponding to each portion of state information is based on the time that the node failure recovery tool 150 received the state information. For example, node failure recovery tool 150 may determine that the time corresponding to information portion 210a is 12:00:01 p.m. because it received the state information of information portion 210a at 12:00:01 p.m. As another example, node failure recovery tool 150 may determine that the time corresponding to information portion 210b is 12:00:03 p.m. because it received the state information of information portion 210b at 12:00:03 p.m. As yet another example, node failure recovery tool 150 may determine that the time corresponding to information portion 210c is 12:00:05 p.m. because it received the state information of information portion 210c at 12:00:05 p.m. In some embodiments, the method 500 continues to step 520 after node failure recovery tool 150 determines a time corresponding to each of the received portions of state information.

At step 530, node failure recovery tool 150 determines that the first node (e.g., node 1 140a) has crashed or otherwise failed. In some embodiments, a determination that the first node has crashed is based on a determination that a related information portion 210 was not received before the expiration of a timer. For example, as illustrated in FIG. 3, node failure recovery tool 150 determines that node 1 140a has crashed because it did not receive state information corresponding to information portion 210d prior to the expiration of a timer. As described above, node failure recovery tool 150 may be configured to start a timer upon receiving each information portion 210 and determine whether a related information portion 210 is received prior to the expiration of the timer. In some embodiments, node failure recovery tool 150 is configured to determine that the sending node (e.g., node 1 140a) has crashed/failed if the state information corresponding to the related information portion 210 is not received before expiration of the timer. In other embodiments, node failure recovery tool 150 is configured to determine that the sending node (e.g., node 1 140a) has not crashed/failed if the state information corresponding to the related information portion 210 is received prior to the expiration of the timer. In some embodiments, the method 500 continues to step 540 upon node failure recovery tool 150 determining that the first node (e.g., node 1 140a) has crashed.

What is claimed is:

1. A node failure recovery tool comprising:
    an interface configured to receive a first portion and a second portion of state information from a first node, each of the first and second portion of state information comprising data about a user and an action and an indication that a third portion of state information is to be received;
    one or more processors configured to:
        determine a time that the first portion of state information was received;
        store, in a memory, the first portion of state information and the time that the first portion of state information was received;
        upon receiving the second portion of state information from the first node, determine a time that the second portion of state information was received and start a timer;
        determine that the second portion of state information comprises data about a first user and a first action;
        determine that the stored first portion of state information comprises data about the first user and the first action;
        in response to determining that the time that the second portion of state information was received is later than the time that the first portion of state information was received and that the first and second portions of state information comprises data about the first user and the first action, replace, in the memory, the first portion of state information with the second portion of state information;
        determine that the timer has expired and that the third portion of state information has not been received;
        upon determining that the timer has expired and that the third portion of state information has not been received, determine that the first node has crashed;
        after determining that the first node has crashed, retrieve, from the memory, the second portion of state information and send the retrieved second portion of state information to the first node so that the first node can recover from the crash.

2. The node failure recovery tool of claim 1, wherein the node failure recovery tool is positioned in a middleware layer of a distribution system.

3. The node failure recovery tool of claim 1, wherein sending the second portion of state information to the first node prevents the node failure recovery tool from receiving state information that was previously received from the first node.

4. The node failure recovery tool of claim 1, wherein the one or more processors are further configured to determine a throughput corresponding to the first node, wherein the throughput is based at least on the time that the first portion of state information was received by the first node.

5. The node failure recovery tool of claim 1, wherein the one or more processors are further configured to determine a latency corresponding to the first node, wherein the latency is based on an amount of time that has passed between the first node's receipt of a first portion of state information and the first node's sending of the first portion of state information.

6. The node failure recovery tool of claim 1, wherein each portion of state information received from the first node is a portion of a larger set of data that the first node is communicating to a second node.

7. The node failure recovery tool of claim 6, wherein sending the state information that was last received from the first node to the first node prevents the first node from sending the larger set of data to the second node more than once.

8. A method comprising:
receiving a first portion and a second portion of state information from a first node, each of the first and second portion of state information comprising data about a user and an action and an indication that a third portion of state information is to be received;
determining a time that the first portion of state information was received;
storing, in a memory, the first portion of state information and the time that the first portion of state information was received;
upon receiving the second portion of state information from the first node, determining a time that the second portion of state information was received and start a timer;
determining that the second portion of state information comprises data about a first user and a first action;
determining that the stored first portion of state information comprises data about the first user and the first action;
in response to determining that the time that the second portion of state information was received is later than the time that the first portion of state information was received and that the first and second portions of state information comprises data about the first user and the first action, replacing, in the memory, the first portion of state information with the second portion of state information;
determining that the timer has expired and that the third portion of state information has not been received;
upon determining that the timer has expired and that the third portion of state information has not been received, determining that the first node has crashed;
after determining that the first node has crashed, retrieving, from the memory, the second portion of state information and sending the retrieved second portion of state information to the first node so that the first node can recover from the crash.

9. The method of claim 8, wherein sending the second portion of state information to the first node prevents the node failure recovery tool from receiving state information that was previously received from the first node.

10. The method of claim 8, determining a throughput corresponding to the first node, wherein the throughput is based at least on the time that the first portion of state information and the time that the second portion of state information was received from the first node.

11. The method of claim 8, further comprising determining a latency corresponding to the first node, wherein the latency is based on an amount of time that has passed between the first node's receipt of a first portion of state information and the first node's sending of the first portion of state information.

12. The method of claim 8, wherein each portion of state information received from the first node is a portion of a larger set of data that the first node is communicating to a second node.

13. The method of claim 12, wherein sending the state information that was last received from the first node to the first node prevents the first node from sending the larger set of data to the second node more than once.

14. A system comprising:
a first node configured to send a first portion and a second portion of state information, each of the first and second portion of state information comprising data about a user and an action and an indication that a third portion of state information is to be received; and
a node failure recovery tool comprising:
an interface configured to receive the first portion and the second portion of state information from the first node; and
one or more processors configured to:
determine a time that the first portion of state information was received;
store, in a memory, the first portion of state information and the time that the first portion of state information was received;
upon receiving the second portion of state information from the first node, determine a time that the second portion of state information was received and start a timer;
determine that the second portion of state information comprises data about a first user and a first action;
determine that the stored first portion of state information comprises data about the first user and the first action;
in response to determining that the time that the second portion of state information was received is later than the time that the first portion of state information was received and that the first and second portions of state information comprises data about the first user and the first action, replace, in the memory, the first portion of state information with the second portion of state information;
determine that the timer has expired and that the third portion of state information has not been received;
upon determining that the timer has expired and that the third portion of state information has not been received, determine that the first node has crashed;
after determining that the first node has crashed, retrieve, from the memory, the second portion of state information and send the retrieved second portion of state information to the first node so that the first node can recover from the crash.

15. The system of claim 14, wherein the node failure recovery tool is positioned in a middleware layer of a distribution system.

16. The system of claim 14, wherein sending the second portion of state information to the first node prevents the node failure recovery tool from receiving state information that was previously received from the first node.

17. The system of claim 14, wherein the one or more processors are further configured to determine a throughput corresponding to the first node, wherein the throughput is based at least on the time that the first portion of state information and the time that the second portion of state information was received from the first node.

18. The system of claim 14, wherein the one or more processors are further configured to determine a latency corresponding to the first node, wherein the latency is based on an amount of time that has passed between the first node's receipt of a first portion of state information and the first node's sending of the first portion of state information.

19. The system of claim 14, wherein each portion of state information received from the first node is a portion of a larger set of data that the first node is communicating to a second node.

20. The system of claim 19, wherein sending the state information that was last received from the first node to the first node prevents the first node from sending the larger set of data to the second node more than once.

* * * * *